(12) United States Patent
Lissack et al.

(10) Patent No.: US 10,497,028 B2
(45) Date of Patent: Dec. 3, 2019

(54) SYSTEMS AND METHODS FOR FACILITATING MONETIZING BRAND INTEGRATION WITHIN ONLINE CONTENT

(71) Applicant: Disney Enterprises, Inc., Burbank, CA (US)

(72) Inventors: Ryan G. Lissack, Manhattan Beach, CA (US); Benjamin P. Collier, Los Angeles, CA (US); David E. Smith, Los Angeles, CA (US); Philip Hansen, Santa Monica, CA (US); Kristopher D. Johns, Los Angeles, CA (US); Narbeh Dereghishian, Westwood, CA (US); Jonathan Bergknoff, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 501 days.

(21) Appl. No.: 14/520,264

(22) Filed: Oct. 21, 2014

(65) Prior Publication Data
US 2015/0112793 A1  Apr. 23, 2015

Related U.S. Application Data

(60) Provisional application No. 61/947,945, filed on Mar. 4, 2014, provisional application No. 61/897,179, filed on (Continued)

(51) Int. Cl.
*G06Q 30/00* (2012.01)
*G06Q 30/02* (2012.01)
(Continued)

(52) U.S. Cl.
CPC ..... *G06Q 30/0273* (2013.01); *G06F 3/04842* (2013.01); *G06F 16/2425* (2019.01);
(Continued)

(58) Field of Classification Search
None
See application file for complete search history.

(56) References Cited

U.S. PATENT DOCUMENTS

2004/0230481 A1   11/2004  Bushold
2008/0033776 A1*   2/2008  Marchese ............. G06Q 20/10
                                                  705/7.33
(Continued)

*Primary Examiner* — Meredith A Long
(74) *Attorney, Agent, or Firm* — Esplin & Associates, PC

(57) ABSTRACT

Monetizing brand integration within online content may be facilitated. Parameter values for parameters describing characteristics of online content, access points, and/or producers may be obtained. The user may define search queries specifying parameter values of one or more parameters. In response to the user defined search query, the system may identify online content and/or access points having parameter values that satisfy the user defined search queries. The user may specify tasks for the identified content and/or access points. The user identified tasks may be related to brand integration. The system may effectuate presentation of the user specified tasks to producers that generate a portion of the identified online content and/or access points. Performance of the user specified tasks may be evaluated to determine an outcome. The outcome may include a quantity of a desired result and/or action. The system may distribute compensation to one or more producers based on the outcome.

18 Claims, 4 Drawing Sheets

Related U.S. Application Data on Oct. 29, 2013, provisional application No. 61/893,393, filed on Oct. 21, 2013.

(51) Int. Cl.
*G06F 16/242* (2019.01)
*G06F 3/0484* (2013.01)

(52) U.S. Cl.
CPC ..... *G06Q 30/0242* (2013.01); *G06Q 30/0256* (2013.01); *G06Q 30/0276* (2013.01); *G06Q 30/0277* (2013.01)

(56) References Cited

U.S. PATENT DOCUMENTS

| | | | |
|---|---|---|---|
| 2008/0065508 A1* | 3/2008 | Watt | G06F 17/30864 |
| | | | 705/26.1 |
| 2008/0275763 A1* | 11/2008 | Tran | G06Q 20/10 |
| | | | 705/35 |
| 2008/0307454 A1* | 12/2008 | Ahanger | G06Q 30/02 |
| | | | 725/36 |
| 2009/0132507 A1* | 5/2009 | Kadambi | G06Q 30/02 |
| 2009/0157450 A1* | 6/2009 | Athsani | G06Q 30/02 |
| | | | 705/35 |
| 2009/0177588 A1* | 7/2009 | Marchese | G06Q 30/02 |
| | | | 705/80 |
| 2009/0216630 A1* | 8/2009 | Carnahan | G06Q 30/02 |
| | | | 705/14.69 |
| 2010/0228603 A1 | 9/2010 | Bolder | |
| 2011/0178837 A1 | 7/2011 | Goerges | |
| 2012/0226602 A1 | 9/2012 | Narcisse | |
| 2013/0085828 A1 | 4/2013 | Schuster | |
| 2013/0343726 A1 | 12/2013 | Shackleton | |
| 2014/0071045 A1 | 3/2014 | Muchnick | |
| 2014/0089322 A1 | 3/2014 | Garcia | |
| 2014/0173644 A1 | 6/2014 | Ball | |
| 2015/0112806 A1 | 4/2015 | Collier | |
| 2015/0112816 A1 | 4/2015 | Collier | |
| 2015/0350259 A1 | 12/2015 | Garg | |
| 2016/0148278 A1 | 5/2016 | Marth | |
| 2016/0189198 A1 | 6/2016 | McKenzie | |
| 2017/0140060 A1 | 5/2017 | Cody | |

\* cited by examiner

SYSTEMS AND METHODS FOR FACILITATING MONETIZING BRAND INTEGRATION WITHIN ONLINE CONTENT

CROSS REFERENCE TO RELATED APPLICATIONS

This application incorporates by reference each of the following provisional applications in their entirety: U.S. Provisional Application No. 61/893,393, filed Oct. 21, 2013, and entitled "Systems and Methods for Managing Online Multimedia Content"; U.S. Provisional Application No. 61/897,179, filed Oct. 29, 2013, and entitled "Systems and Methods for Managing Online Multimedia Content"; and U.S. Provisional Application No. 61/947,945, filed Mar. 4, 2014, and entitled "Systems and Methods for Developing Talent and Creating and Managing Online Programming".

FIELD

The disclosure relates to systems and methods for facilitating monetizing brand integration within online content.

BACKGROUND

Internet advertising based on a user's previous searches is known. Typically, ads or banners may be placed next to search results or web page content. Those ads or banners may be generated automatically based on what may interest the viewer as gleaned by previous searches. Different viewers may be served different ads based on their own individual search histories. Two existing approaches for internet advertising include cost per click and cost per impression advertising models. Typically, in a cost per click model, advertisers pay when their ad is clicked compared to in cost per impression model where advertisers pay for each time their ad is shown.

SUMMARY

One aspect of the disclosure relates to a system configured for facilitating monetizing brand integration within online content. In exemplary implementations, the system may obtain parameter values for parameters describing characteristics of online content, access points, and/or producers. Online content may include one or more of online video content, social media content, online photo content, and/or other online content. Access points may include online mechanisms by which online content is served up and/or provided. For example, an access point may include one or more of an online content channel, an online content feed, and/or other access points. The user may define search queries specifying parameter values of one or more parameters. In response to the user defined search query, the system may identify online content and/or access points having parameter values that satisfy the user defined search queries. For example, the system may determine online content and/or access points that satisfy the user defined search queries. The user may specify tasks for the identified online content and/or access points. The user identified tasks may be related to brand integration. The system may effectuate presentation of the user specified tasks to producers. A given producer may generate, produce, originate, or otherwise provide the identified online content. A given producer may host, contribute to, or otherwise participate with the identified access points. Generating a portion of the identified access points may include generating a portion of content served up and/or provided by the identified access points. The performance of an individual one of the user specified tasks by an individual one of the producers may be evaluated to determine an outcome. The system may distribute compensation based on the outcome to the individual ones of the one or more producers that performed the user specified task.

In some implementations, the system may include one or more servers. The server(s) may be configured to communicate with one or more client computing platforms according to a client/server architecture. The users may access the system via client computing platform(s). The server(s) may be configured to execute one or more computer program components. The computer program components may include one or more of a producer account component, parameter component, a query component, a content identification component, a task component, a content provisioning component, a control component, and/or other components.

The producer account component may be configured to access and/or manage one or more producer profiles and/or producer information associated with producers of the system. The one or more producer profiles and/or producer information may include information stored by servers, client computing platforms, and/or other storage locations. The producer profiles and/or producer information may include, for example, online content and/or access points generated by producers, information identifying producers (e.g., a username or handle, a number, an identifier, and/or other identifying information), security login information (e.g., a login code or password), virtual space account information, subscription information, a stored value representing currency information (e.g., related to compensation earned), online content and/or access point information, online content and/or access point subscriptions, demographic information associated with producers, user identified task performance history, performance evaluation information, and/or other information related to producers.

The parameter component may be configured to obtain parameter values for parameters that describe characteristics of one or more of online content, access points, producers, and/or other features related to online content its production, distribution, consumption, and/or monetization. The characteristics of online content may include one or more of subject matter characteristics, audience characteristics, temporal characteristics, format characteristics, distribution characteristics, outcome characteristics, and/or other characteristics of online content. The characteristics of access points may include one or more of subscriber characteristics, associated content characteristics, access point format characteristics, and/or other access point characteristics. The characteristics of producers may include one of more of characteristics of content and/or access points generated by a given producer, task performance characteristics, and/or other characteristics of producers.

The query component may be configured to receive user defined search queries specifying parameter values for one or more parameters. For example, the parameter values for one or more parameters may include a quantity, term, binary value, range, a selection from a dropdown menu, a selection from a radio button, a selection from a check box, and/or other parameter value representing the boundaries of the query for one or more parameters.

The content identification component may be configured to identify online content and/or access points having parameter values that satisfy the user defined search queries. In some implementations, responsive to receipt of a user defined search query specifying parameter values for a set of one or more parameters, a set of online content and/or access points having parameter values that satisfy the user defined search query may be identified. For example, a search query for a video channel with a subscriber count as the parameter and at least 1000 as the parameter value would identify video channels having a subscriber count corresponding to the parameter value of at least 1000 subscribers.

The task component may be configured to receive user specified tasks for identified online content and/or access points. The user specified tasks may be related to brand integration within the identified online content and/or access points. For example, the user specified tasks may include one or more of integrating an advertisement into a portion of online content, creating a portion of online content, endorsing a portion of online content, promoting a portion of online content, and/or other user specified tasks. In some implementations, the user specified tasks may include a user specified task for the set of online content and/or access points identified as satisfying the user defined search query. For example, a given user specified task may include placing an advertisement within an online video content that satisfies the given user defined search query of having more than 5,000 views.

The content provisioning component may be configured to effectuate presentation of the user specified tasks to producers associated with the identified online content and/or access points. For example, an offer to perform the user specified task may be presented to the producer of the online content and/or access points identified by the user defined search query. In some implementations, a producer that generates at least a portion of the set of online content and/or access points identified by the user defined search query may be presented with the user specified task.

In some implementations, the content provisioning component may be configured to facilitate acceptance of the user specified tasks by one or more of the producers. Such acceptance may be responsive to the presentation of the user specified tasks to producers. For example, acceptance may include acceptance of the offer (e.g., representing acceptance of the user specified task presented).

In some implementations, the content provisioning component may be configured to facilitate display of the online content resulting from a performed user specified task. The display of the online content may include publication of the online content resulting from the performed user specified task. In some implementations, the display or publication of the online content resulting from the performed user specified task may be via a social media platform, a website, a system channel and/or portal, and/or other publication locations.

The control component may be configured to evaluate performance of a given user specified task by a given producer to determine an outcome. The outcome may correspond to a desired result and/or action based on the user specified task. In some implementations, the desired result and/or action may include a content consumer action based on the online content resulting from the performed user specified task. For example, a desired result and/or action may include a content consumer selecting and/or clicking on a portion of the online content, viewing a portion of the online content, promoting a portion of the online content, endorsing a portion of the online content, and/or other content consumer actions.

In some implementations, the control component may be configured to facilitate approval of the user specified tasks. Such approval may be responsive to the performance of user specified tasks by one or more of the producers. For example, approval may include confirmation that the user specified task performed by the one or more producers represents the user specified task presented to the one or more producers. As another example, approval may include a user indicating the user specified task performed was performed correctly according to the user specified task presented. In some implementations, approval may be required prior to display or publication of the online content resulting from the user specified task.

The control component may be configured to distribute compensation based on the outcome. The compensation may include a stored value, wages, cash and/or check, awarded points, earned prizes, and/or other compensation including a representation of payment earned by the producer. In some implementations, as the outcome quantity increases, compensation may increase directly. For example, a producer may earn a compensation value and/or amount for individual times a content consumer clicks on and/or selects an advertisement integrated into the online content by the producer. In some implementations, a producer may earn a flat compensation value for individual user specified tasks presented to and performed by the producer.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
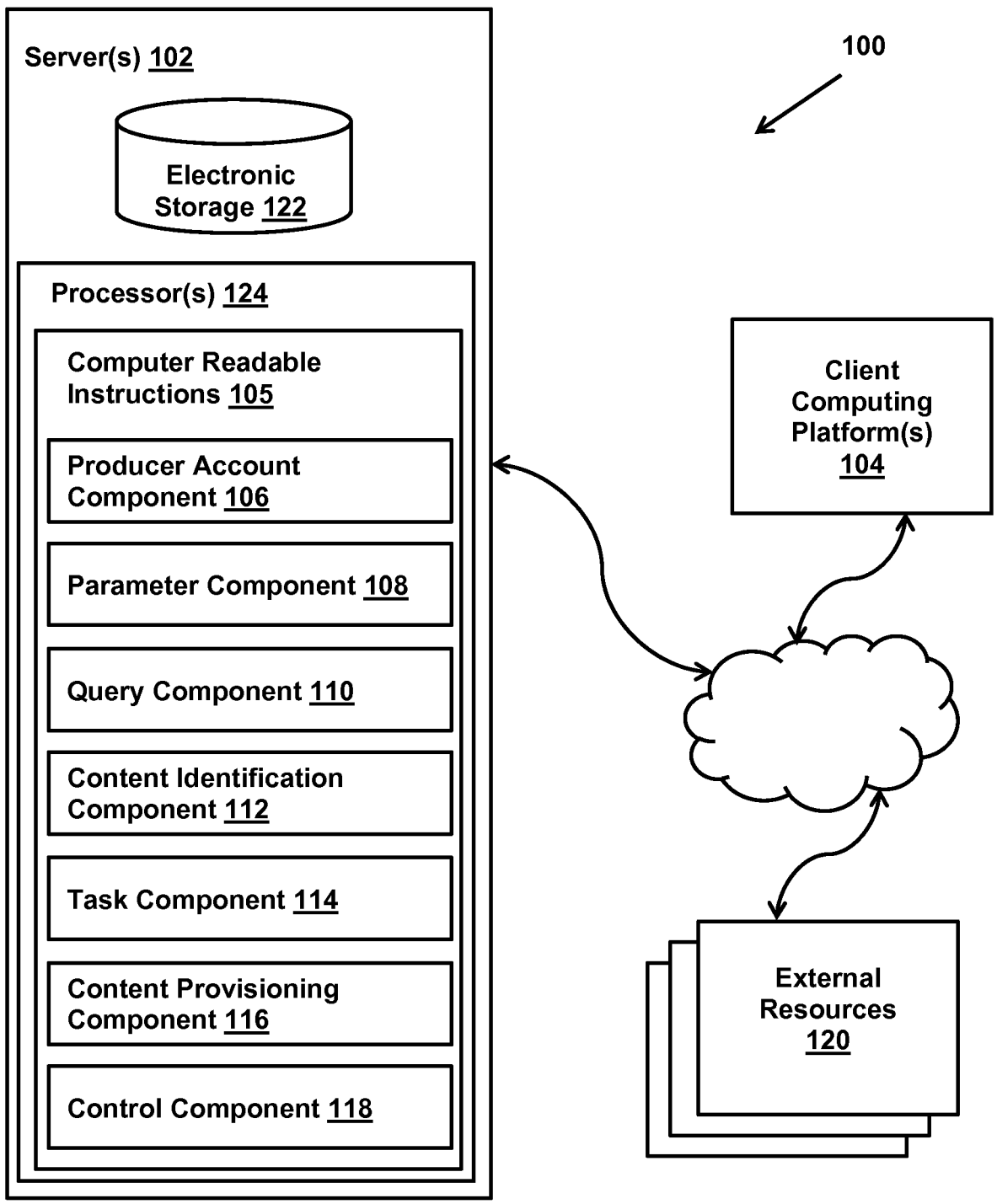
FIG. 1 illustrates a system configured for facilitating monetizing brand integration within online content, in accordance with one or more implementations.

FIG. 1 illustrates a system 100 configured for facilitating monetizing brand integration within online content, in accordance with one or more implementations. Online content may include one or more of and/or a portion of an online video content, a social media content, an online photo content, and/or other online content.

In exemplary implementations, system 100 may aggregate parameter values for parameters describing characteristics of online content. A user may define search queries specifying parameter values of one or more parameters. The user may include one or more of an advertiser, a company, a third party affiliate of system 100, and/or other users. In some implementations, the user may communicate with one or more advertisers and interface with system 100 on behalf of the advertisers.

In response to the user defined search query, system 100 may identify online content and/or access points having parameter values that satisfy the user defined search queries. Access points may include online mechanisms by which online content is served up and/or provided. An access point may include one or more of an online content channel, an online content feed, and/or other access points. For example, an online content channel may include a YouTube channel. An online content feed may include, for example, a Facebook news feed, Twitter news feed, Pinterest board, and/or other online content feeds.

System 100 may determine online content and/or access points that satisfy the user defined search queries. The user may specify tasks for the identified content and/or access points. The user specified task for identified content may result in augmentation of the online content. The user specified task for identified access points may result in new content. The user identified tasks may be related to brand integration.

Producers that generate a portion of the identified online content and/or access points may be presented with the user specified tasks. For example, producers may be presented with user specified tasks such that the presentation may include an offer for the producer to perform the user specified task. The performance of an individual one of the user specified tasks by an individual one of the producers may be evaluated to determine an outcome. System 100 may be configured to distribute compensation to the individual one of the one or more producers that performed the user specified task, based on the outcome.

In some implementations, system 100 may include one or more servers 102. The server(s) 102 may be configured to communicate with one or more client computing platforms 104 according to a client/server architecture. The users may access system 100 via client computing platform(s) 104. The server(s) 102 may be configured to execute computer readable instructions 105. The computer readable instructions 105 may include one or more of a producer account component 106, a parameter component 108, a query component 110, a content identification component 112, a task component 114, a content provisioning component 116, a control component 118, and/or other components.

Producer account component 106 may be configured to access and/or manage one or more producer profiles and/or producer information associated with producers of system 100. The one or more producer profiles and/or producer information may include information stored by server(s) 102, client computing platforms 104, and/or other storage locations. The producer profiles and/or producer information may include, for example, online content generated by producers, information identifying producers (e.g., a username or handle, a number, an identifier, and/or other identifying information), security login information (e.g., a login code or password), account information, subscription information, stored value account information (e.g., virtual currency), online content information, online content subscriptions, demographic information associated with producers, user identified task performance history, performance evaluation information, information reflecting online content characteristics (e.g., parameter values, and/or other information), and/or other information related to producers.

Parameter component 108 may be configured to obtain parameter values of parameters associated with online content. The parameters may describe one or more of online content characteristics, access point characteristics, producer characteristics, and/or other features related to production, distribution, consumption, and/or monetization of online content.

Online content characteristics may include one or more of subject matter characteristics, audience characteristics, temporal characteristics, format characteristics, distribution characteristics, outcome characteristics, and/or characteristics of other aspects of online content.

Subject matter characteristics may describe the material within the online content. Examples of subject matter characteristics of online content may include a genre, topic, title, description, tags, commentary, amount of content, and/or other subject matter characteristics of the online content. For example, an online video may have a game genre.

An audience characteristic may describe information or characteristics related to the audience of the online content. Examples of audience characteristics may include audience demographic information, audience size, audience comment activity, audience viewing habits, audience responsiveness, audience spending characteristics, audience monetization, audience interests, proclivity to participate in social sharing, and/or other audience characteristics.

Demographic information may include one or more of information and/or statistics related to a content consumer population of the online content. Information and/or statistics related to a content consumer population may include one or more of age, gender, ethnicity, race, marital status, income level, education, occupation, geographic location, language, and/or other demographic information. Audience size may include a size and/or breadth of the content consumer population. Audience viewing habits may include information related to the habits of the content consumer population while viewing online content. For example, an audience viewing habit may include that 60% of content consumers view a given online content from their home computer. Audience responsiveness may describe a content consumer population's likelihood and/or history of interacting with the online content. For example, audience responsiveness may include that 15% of the content consumer population of a given time period clicked an advertisement link integrated into online video content. Audience spending characteristics may describe the spending tendencies of a given content consumer population. For example, an audience spending characteristic may include an amount of instances that viewing an advertisement led to the purchase of a product of the advertisement by one or more of the content consumer population. Audience interests may describe the interests of the content consumer population. Audience proclivity to participate in social sharing may describe the likelihood and/or activity level of actual and/or potential audience participation.

Temporal characteristics may describe a date and/or time aspects of online content. For example, a temporal characteristics may include one or more of a time the online content was last viewed and/or promoted, the length of the online content, periods at which online content (e.g., episodes) are released, content velocity (e.g., rate of content release/production), impressions of new content, impressions of library content, and/or other information relating to other time features of the online content.

Format characteristics may describe a content format, file format, and/or other format characteristics of the online content. The content format may include information related to the form of the online content. Examples of content format may include one or more of a video, a picture, a social media post and/or other content formats. The file format may include information related to a structure of a file that may define the way it is stored and displayed on a screen. Examples of file formats may include one or more of .JPG, .PNG, .MOV, .MPEG4, .MP4, .AVI, .WMV, .MPEGPS, .FLV, .3GPP, and/or other file formats.

Distribution characteristics may describe the how online content is displayed or distributed. Distribution characteristics may include publication locations. Examples of distribution characteristics may include one or more of a system video channel, Facebook, YouTube, Twitter, Pinterest, LinkedIn, Google+, Flickr, Tumblr, Blogger, Vine, Instagram, Snapchat, Maker.TV, broadcast or cable television, and/or other publication locations. Outcome characteristics may describe aspects of content consumer actions resulting from the online content. Examples of outcome characteristics include, for example, a view count, promotion count, a comment count, an endorsement count, a sharing count, an up-vote count, and/or other outcome characteristics. A view count may include a number of times the online content is viewed by a content consumer. A promotion count may include a number of times the online content is advanced. A comment count may include a number of comments generated for the online content. An endorsement count may include a number of times the online content is supported. A sharing count may include a number of times the online content is shared. An up-vote count may include the number of times the content is upvoted and/or liked. For example, an outcome characteristic of an online video may include a view count of 1,000.

Access point characteristics may describe the type and/or features of an access point. The characteristics of access points may include one or more of subscriber characteristics, associated content characteristics, access point format characteristics, and/or other access point characteristics. Access point characteristics may identify access points Subscriber characteristics may differ from audience characteristics because subscriber characteristics may describe characteristics of the subscribers of a given access point. Subscribers may include a limited portion of the content consumer population that subscribes to and/or follows online content associated with a given access point. Examples of subscriber characteristics include one or more of a subscriber count, subscriber demographic information, and/or other subscriber characteristics. In some implementations, a subscriber count may include a quantity of content consumers who follow and/or subscribe to the online content access point. Subscriber demographic information may include statistics related to the content consumers who follow and/or subscribe to the online content access point. Associated content characteristics may describe characteristics of the content associated with, served up by, and/or provided by a given access point. Examples of associated content characteristics may include one or more of a content theme, one or more of the characteristics of online content disclosed above, and/or other associated content characteristics. A content theme may include a genre or topic related to the content available via the access point. For example, a content theme with corresponding access point may include an online travel video channel, an online video game channel, a feed of a social media group for sports, and/or other examples of content themes describing the content access points. Access point format characteristics may describe the form of the access point. Examples of access point format characteristics may include one or more of, an online video channel, an online content feed, and/or other access points.

Producer characteristics may include one of more of characteristics of content and/or access points associated with and/or generated by a given producer, and/or task performance characteristics. In some implementations, characteristics of content and/or access points generated by a given producer may include one or more of the characteristics of online content and/or access points as described above. Task performance characteristics may describe a given producer's performance of user specified tasks. Examples of task performance characteristics include one or more of a task acceptance rating, a monetization success rating, a number of tasks performed, and/or other characteristics related to the task performance of a given user. The task acceptance rating may include a representation of the amount of user specified tasks a given producer of the online content performs compared to those presented. The monetization success rating may include a representation of the success of the online content producer's prior performed user specified tasks and/or a predicted representation of the given producer's future success. The number of tasks performed may include a quantity of user specified tasks performed by a given producer.

In some implementations, a monetization success rating may be determined by a variety of factors including, for example, one or more of a producer's frequency of engaging with the portion of the user interface which displays user specified tasks (e.g., offers) presented to a given producer, an amount of engagements with specific user specified tasks presented to a given talent, user specified tasks activated and/or accepted by a given talent, performance of user specified tasks, approval of user specified tasks, outcome performance of online content resulting from user specified tasks, delta between online content resulting from user specified tasks and non-user specified task content, delta of engagement metrics between online content resulting from user specified tasks and non-user specified task content, the audience size, and/or other factors.

In some implementations, parameter component 108 may be configured to obtain parameter values from one or more of the producer information accessed managed by producer account component 106, task component 114, control component 118, third party sources, and/or other locations.

Query component 110 may be configured to receive user defined search queries specifying parameter values for one or more the parameters. For example, the parameter values for one or more parameters may include one or more of a quantity, a key word, a binary value, a range, a selection from a dropdown menu, a selection from a radio button, a selection from a check box, and/or other parameter value representing the boundaries of the query for one or more parameters. For example, parameter values may include a content format of video content, a subject matter of cooking, and/or a view count of over 1,000 content consumers.

In some implementations, a user defined search query may include an access point format of an online video channel and a content count of at least 60 videos and/or episodes. For example, a user defined search query may include a monetization success rating of a "9/10" and a task acceptance rating of greater than 50%. A user defined search query may include a content format of video content and a comment count of greater than 50.

Content identification component 112 may be configured to identify online content and/or access points having parameter values that satisfy the user defined search queries. In some implementations, responsive to receipt of a given user defined search query specifying parameter values for a given set of one or more parameters, content identification component 112 may identify a given set of online content and/or access points having parameter values that satisfy the given user defined search query. In some implementations, the set of online content and/or access points having parameter values that satisfy the user defined search query may represent a user's desired target content for potential brand integration. For example, a user's desired target content for potential brand integration may be videos with at least 1000 views and/or channels with at least 1000 subscribers. In some implementations, parameter values may identify online content and/or access points within a parameter. For example, the corresponding search query for a user's desired target content may include content format and subscriber count as the parameters, and online video content and at least 1000 views as parameter values. The corresponding search query for a user's desired target access channel may include access point format and subscriber count as the parameters, and online video channel and at least 1000 as the parameter values.

Task component 114 may be configured to receive user specified tasks for the identified online content and/or access points. The user specified tasks may be related to brand integration within identified online content and/or access points. In some implementations, one or more of the components of task component 114 may be the same as and/or similar to one or more components of the task component described in U.S. patent application Ser. No. 14/520,271 filed on Oct. 21, 2014, and entitled "Systems And Methods For Facilitating Brand Integration Within Online Content And Promoting That Online Content", which is incorporated herein by reference in its entirety.

In some implementations, the user specified tasks may include a given user specified task for online content and/or access points identified as satisfying the given user defined search query. In some implementations, the user specified tasks may include one or more of integrating an advertisement into a portion of online content, creating a portion of online content, endorsing a portion of online content, promoting a portion of online content, creating a portion of pay and/or advertising content to be used pre-roll, denoting "sponsorship", and/or other user specified tasks. For example, integrating an advertisement into a portion of online content may include posting a link in an online video description. Creating a portion of online content may include one or more of, creating video content as a portion of online video channel content, posting a text advertisement as a portion of a social media feed, creating a video advertisement as part of a social media feed, and/or creating other online content. Endorsing a portion of the online content may include "liking", rating, thumbs-upping, and/or otherwise endorsing a portion of online content. Promoting a portion of online content may include sharing, posting, linking, and/or otherwise promoting a portion of online content. Creating a portion of pay and/or advertising content to be used pre-roll may include creating advertising content for pay content access points to be displayed prior to the online content purchased and/or associated with a purchase and/or membership. Denoting "sponsorship" may include an indication that online content is sponsored and/or supported by a given user and/or advertiser. For example, denoting sponsorship may include thanking a sponsor and/or user in a given online content.

By way of non-limiting example, a given user specified task may include placing an advertisement within online video content that satisfied the given user defined search query of online video content having more than 5,000 views. As another example, a given user specified task may include posting an endorsement within a social media feed that satisfied the given user defined search query of online content feed generated by a producer with at least 100 subscribers. In yet another example, a given user specified task may include creating a portion of online video content for an online video channel that satisfied the given user defined search query of online video channels having more than 1,000 subscribers.

Content provisioning component 116 may be configured to effectuate presentation of the user specified tasks to producers that associated with a portion of the identified online content and/or access points. Associated with a portion of the identified online content may include having generated and/or created a portion of the online content and/or access point. For example, a user specified task may be presented to the producer of a portion of the online content and/or access points identified in the form of an offer. In some implementations, content provisioning component 116 may be configured such that a given producer that generates at least a portion of the given set of online content and/or access points, is presented with the given user specified task. For example, a given user specified task of placing an advertisement within the online video content that satisfied the given user defined search query, may be presented to the producer that generated the online video content that satisfied the given user defined search query. For example, a given user specified task of creating advertising online video content for a video channel identified as satisfying the given user defined search query, may be presented to the producer that generated a portion of the access point that satisfied the given user defined search query.

In some implementations, content provisioning component 116 may be configured to facilitate acceptance of the user specified tasks by one or more of the identified producers. The facilitation of acceptance may be responsive to the presentation of the user specified tasks to one or more producers. For example, acceptance may include a producer's agreement to perform the presented user specified task.

In some implementations, content provisioning component 116 may be configured to facilitate display of the online content resulting from the performed user specified task. The display of the online content may include publication of the online content resulting from the performed user specified task. For example, the display or publication of the online content resulting from the performed user specified task may be via one or more virtual environments. A "virtual environment" may include a virtual space, one or more interactive, electronic social media, and/or other virtual environments. For example, electronic social media may include a social media platform. The social media platform may include, for example, one or more of Facebook, YouTube, Twitter, Pinterest, LinkedIn, Google+, Flickr, Tumblr, Blogger, and/or other social media platforms.

Control component 118 may be configured to evaluate performance of user specified tasks to determine an outcome corresponding to individual user specified tasks. The outcome may correspond to a quantity of a desired result and/or action based on the user specified task. In some implementations, the desired result and/or action may include a content consumer action based on the online content including the performed user specified task. A content consumer may include a user who views, contributes to, interacts with, and/or accesses digital media via the internet. A content consumer action may include, for example, a content consumer selecting and/or clicking on a portion of the online content, viewing a portion of the online content, promoting a portion of the online content, endorsing a portion of the online content, opening a new account based on the online content, downloading content based on the online content, other cost per action actions, and/or other content consumer actions. In some implementations, the outcome may be a quantity of a desired result and/or action corresponding to the user specified task. For example, the outcome may include the number of times a content consumer clicks on an advertisement integrated into the identified online content (e.g., integration of the advertisement corresponding to the given user specified task). The outcome may include a number of times content consumers "like" a portion of content generated as based on the user specified task as part of an identified online content and/or access points. The outcome may include a number of times content consumers view the online content identified and endorsed by a producer based on the user specified task.

In some implementations, control component 118 may be configured to facilitate approval of the user specified tasks. Approval may be responsive to the performance of user specified tasks by one or more of the producers. In some implementations, approval may include confirmation that the user specified task performed by one or more of the producers represents the user specified task presented to one or more the producers. For example, approval may include a user indicating the performed user specified task was performed according to specifications set forth by the user in the user specified task presented. The specifications set forth by the user may include criteria and/or requirements the user expects the performed user specified task to meet. In some implementations, approval may be required prior to display and/or publication of the online content including the performed user specified task.

Control component 118 may be configured to distribute compensation. Distribution of compensation may be based on the outcome of a given producer's performance of the user specified task. The compensation may include a stored value, wages, cash and/or check, awarded points, earned prizes, and/or other compensation including a representation of payment earned by the producer. In some implementations, as the outcome increases, compensation may increase. For example, a producer may earn a compensation for individual times a content consumer clicks on and/or selects an advertisement integrated into the online content by the producer responsive to the presentation of the user specified task to the producer. In some implementations, a producer may earn a flat compensation value for individual user specified tasks presented to and performed by the producer.

Referring again to producer account component 106, producer profiles and/or producer information managed and/or accessed by producer account component 106 may include outcome information, compensation information, monetization information, and/or other information related to facilitating monetizing brand integration within online content. In some implementations, producer account component 106 may effectuate presentation of a producer interface (see, e.g., FIG. 3). The producer interface may facilitate display of a portion of the producer profile and/or producer information. In some implementations, content provisioning component 116 may effectuate presentation of the user specified tasks to producers via the producer interface. In some implementations, content provisioning component 116 may facilitate acceptance of one or more of the user specified tasks by one or more producers via the producer interface.

Figure 2:
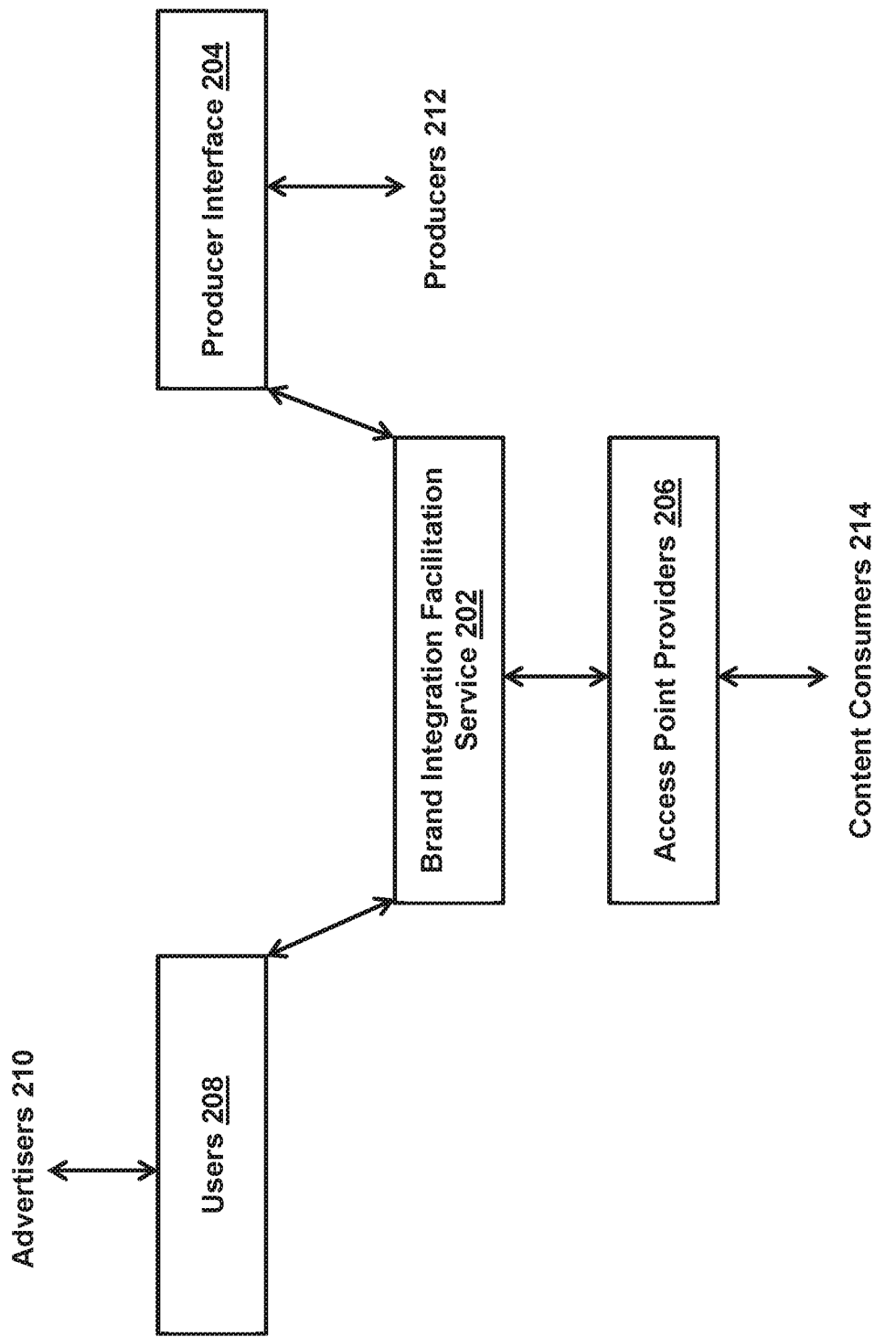
FIG. 2 illustrates an exemplary architecture for the system of FIG. 1, in accordance with one or more implementations.

FIG. 2 illustrates an exemplary architecture for system 100, in accordance with one or more implement. A brand integration facilitation service 202 may operate server(s) 102 (see FIG. 1). Brand integration facilitation service 202 may communicate with multiple parties including one or more of a user 208, an advertiser 210, a producer 212, an access point provider 206, content consumers 214, and/or other parties. Brand integration facilitation service 202 may communicate with producer 212 via producer interface 204. Users 208 may provide user defined search queries to brand integration facilitation service 202. Users 208 may provide user specified tasks to brand integration facilitation service 202. Brand integration facilitation service 202 may identify online content and/or access points (see, e.g., content identification component 112 described in connection with FIG. 1). Brand integration facilitation service 202 may associate identified online content and/or access points with given producers.

Brand integration facilitation service 202 may communicate user specified tasks to associated producers 212 (see, e.g., provisioning component 116 described in connection with FIG. 1). Producer interface 204 may facilitate display of the user specified tasks to producers 212. Producers 212 may accept user specified tasks. Producers 212 may perform user specified tasks. Brand integration facilitation service 202 may facilitate display and/or publication of online content resulting from the user specified task performed by producer 212 via access point providers 206. Access point providers 206 may provide one or more access points (described further herein). Content consumers 214 may access, view, interact with, and/or otherwise consume online content resulting from the user specified task via access point provider 206. Brand integration facilitation service 202 may evaluate performance of the first user specified task (see, e.g., control component 118 described in connection with FIG. 1). Brand integration facilitation service 202 may determine an outcome corresponding to the online content resulting from the first user specified task (see, e.g., control component 118 described in connection with FIG. 1). In some implementations, brand integration facilitation service 202 may evaluate performance and/or determine an outcome via a third party provider. Users 208 may compensate producers 212 via brand integration facilitation service 202.

Figure 3:
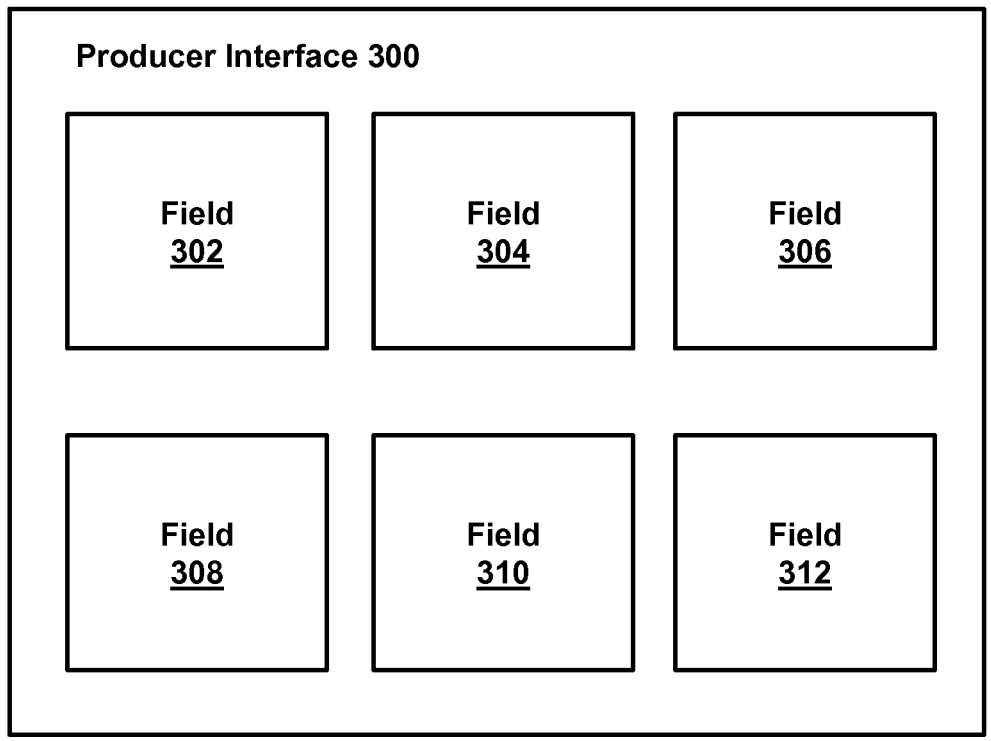
FIG. 3 illustrates a view of a producer interface, in accordance with one or more implementations

FIG. 3 illustrates a view of a producer interface 300, in accordance with one or more implementations. Producer interface 300 may include one or more of fields 302, 304, 306, 308, 310, 312 and/or other fields. In some implementations, one or more of the components of producer interface 300 may be the same as and/or similar to one or more components in the producer interface described in U.S. patent application Ser. No. 14/520,275 filed on Oct. 21, 2014, entitled, "Systems And Methods For Providing a Graphical User Interface For Providing Brand Integration Within Online Content, Managing Brand Integration Within Online Content, And/Or Managing Compensation Associated With Online Content", which is incorporated herein by reference in its entirety. In some implementations, field 302 may be configured to facilitate display of one or more user specified tasks presented to a producer corresponding to producer interface 300 based on information from task component 114. Field 304 may be configured to facilitate display of the compensation determined by control component 118 and based on an outcome associated with one or more user specified tasks performed by the producer corresponding to producer interface 300. Field 306 may facilitate display of information related to managing and/or tracking monetizing brand integration based on information from parameter component 108 and/or control component 118. Field 308 may facilitate display of compensation history and/or information from control component 118. Field 310 may facilitate display of user specified task history from information from task component 114 and/or control component 118. Field 312 may facilitate display of producer profiles and/or information from producer account component 106.

It should be appreciated that although fields 302, 304, 306, 308, 310, and 312 are illustrated in FIG. 3 as being co-located within a single view of producer interface 300, that is not intended to be limiting. Rather, one or more of fields 302, 304, 306, 308, 310, and 312 may be included in separate views of producer interface 300. The description of the functionality provided by the different fields 302, 304, 306, 308, 310, and 312 described herein is for illustrative purposes, and is not intended to be limiting, as any of fields 302, 304, 306, 308, 310, and 312 may provide more or less functionality than is described. For example, one or more of fields 302, 304, 306, 308, 310, and 312 may be eliminated, and some or all of its functionality may be provided by other ones of fields 302, 304, 306, 308, 310, and 312. As another example, producer interface 300 may be configured to provide one or more additional fields that may perform some or all of the functionality attributed herein to one of fields 302, 304, 306, 308, 310, and 312.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

The external resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

The server(s) 102 may include electronic storage 122, one or more processors 124, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include a plurality of processing units. These processing units may be physically located within the same device, or processor(s) 104 may represent processing functionality of a plurality of devices operating in coordination. The processor(s) 104 may be configured to execute computer readable instruction components 106, 108, 110, 112, 114, 116, 118, and/or other components. The processor(s) 124 may be configured to execute components 106, 108, 110, 112, 114, 116, 118, and/or other components by software; hardware; firmware; some combination of software, hardware, and/or firmware; and/or other mechanisms for configuring processing capabilities on processor(s) 124.

It should be appreciated that although components 106, 108, 110, 112, 114, 116, and 118 are illustrated in FIG. 1 as being co-located within a single processing unit, in implementations in which processor(s) 124 includes multiple processing units, one or more of components 106, 108, 110, 112, 114, 116, and/or 118 may be located remotely from the other components. The description of the functionality provided by the different components 106, 108, 110, 112, 114, 116, and/or 118 described herein is for illustrative purposes, and is not intended to be limiting, as any of components 106, 108, 110, 112, 114, 116, and/or 118 may provide more or less functionality than is described. For example, one or more of components 106, 108, 110, 112, 114, 116, and/or 118 may be eliminated, and some or all of its functionality may be provided by other ones of components 106, 108, 110, 112, 114, 116, and/or 118. As another example, processor(s) 124 may be configured to execute one or more additional components that may perform some or all of the functionality attributed herein to one of components 106, 108, 110, 112, 114, 116, and/or 118.

Figure 4:
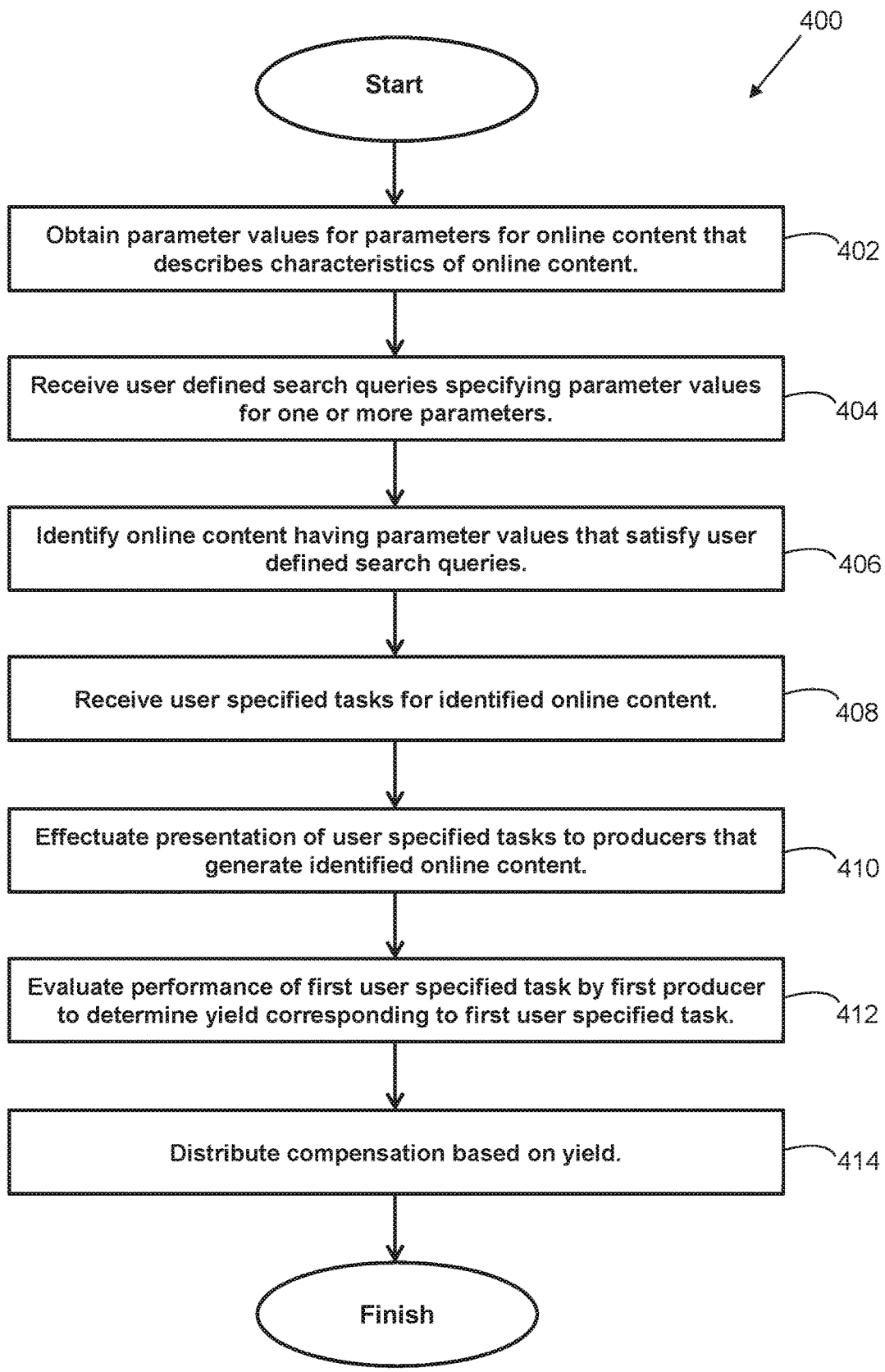
FIG. 4 illustrates a method for facilitating monetizing brand integration within online content, in accordance with one or more implementations.

FIG. 4 illustrates a method 400 for facilitating monetizing brand integration within online content, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, values for parameters for online content and/or access points that describe characteristics of one or more of online content, access points, and/or producers. Operation 402 may be performed by a parameter component that is the same as or similar to parameter component 108, in accordance with one or more implementations.

At an operation 404, user defined search queries specifying parameter values for one or more parameters may be received. Operation 404 may be performed by a query component that is the same as or similar to query component 110, in accordance with one or more implementations.

At an operation 406, online content and/or access points having parameter values that satisfy the user defined search queries may be identified. In some implementations, responsive to receipt of a given user defined search query specifying parameter values for a given set of one or more parameters, a given set of online content and/or access points having parameter values that satisfy the given user defined search query may be identified. Operation 406 may be performed by a content identification component that is the same as or similar to content identification component 112, in accordance with one or more implementations.

At an operation 408, user specified tasks for identified online content and/or access points may be received. The user specified tasks may be related to brand integration within the identified online content and/or access points. The user specified tasks may include a given user specified task for online content and/or access points identified as satisfying the given user defined search query. Operation 408 may be performed by a task component that is the same as or similar to task component 114, in accordance with one or more implementations.

At an operation 410, presentation of the user specified tasks to producers associated with a portion of the identified online content and/or access points may be effectuated. In some implementations, a given producer that generates at least a portion of the given set of online content and/or access points may be presented with the given user specified task. Operation 410 may be performed by a content provisioning component that is the same as or similar to content provisioning component 116, in accordance with one or more implementations.

At an operation 412, performance of the given user specified task by the given producer may be evaluated to determine an outcome corresponding to the given user specified task. The outcome may be a quantity of a desired result and/or action. Operation 412 may be performed by a control component that is the same as or similar to control component 118, in accordance with one or more implementations.

At an operation 414, compensation based on the outcome may be distributed. The compensation may include a stored value including a representation of payment earned by the given producer. Operation 414 may be performed by a control component that is the same as or similar to control component 118, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate monetizing brand integration within online content, the system comprising:
one or more physical computer processors configured by computer readable instructions to:
obtain parameter values for parameters of individual online content items, the parameter values for the parameters describing online content characteristics of the individual online content items, the online content characteristics including outcome characteristics of the individual online content items describing aspects of consumer actions resulting from the individual online content items;
receive user defined search queries specifying parameter values for one or more of the parameters of the individual online content items, wherein the specified parameter values are devoid of information that identifies producers of the individual online content items;
identify individual online content items having parameter values that satisfy the user defined search queries without regard to the producers of the individual online content items, such that responsive to receipt of a first user defined search query specifying parameter values for a first set of one or more parameters, a first set of individual online content items having parameter values that satisfy the first user defined search query is identified;
receive user specified tasks for identified individual online content items included in the first set of individual online content items, the user specified tasks being related to brand integration within the identified individual online content items included in the first set of individual online content items, the user specified tasks comprising a first user specified task for the identified individual online content items included in the first set of individual online content items;
effectuate presentation of the user specified tasks to the producers associated with the identified individual online content items included in the first set of individual online content items, such that a first producer that generates a first identified individual online content item is presented with the first user specified task;

evaluate performance of the first user specified task by the first producer to determine an outcome corresponding to the first user specified task; and distribute compensation based on the outcome, the compensation including a stored value including a representation of payment earned by the first producer.

2. The system of claim 1, wherein:

an individual online content item includes an individual video, an individual photo, or an individual social media post.

3. The system of claim 1, wherein the user specified tasks include one or more of integrating an advertisement into a portion of online content, creating a portion of online content, endorsing a portion of online content, and/or promoting a portion of online content.

4. The system of claim 1, wherein the one or more physical computer processors are further configured by computer readable instructions to, responsive to the presentation of the user specified tasks to producers, facilitate acceptance of one or more of the user specified tasks by one or more producers.

5. The system of claim 1, wherein the one or more physical computer processors are further configured by computer readable instructions to facilitate approval of the user specified tasks, approval being confirmation that the user specified task performed by one or more producers represents the user specified task presented.

6. The system of claim 1, wherein the one or more physical computer processors are further configured by computer readable instructions to, facilitate display of the individual online content items resulting from the user specified task, the display being a publication of the individual online content items resulting from the user specified task.

7. The system of claim 6, wherein the one or more physical computer processors are further configured by computer readable instructions to facilitate display of the individual online content items resulting from the user specified task, via a social media platform.

8. The system of claim 1, wherein the outcome includes a content consumer action based on the individual online content items resulting from the user specified task.

9. The system of claim 1, wherein the outcome characteristics describing aspects of consumer actions resulting from the individual online content items include one or more of a promotion count of the individual online content items, an endorsement count of the individual online content items, or a sharing count of the individual online content items.

10. A method to facilitate monetizing brand integration within online content, the method being implemented in a computer system comprising one or more physical processors and non-transitory electronic storage storing machine-readable instructions, the method comprising:

obtaining parameter values for parameters of individual online content items, the parameter values for the parameters describing online content characteristics of the individual online content items, the online content characteristics including outcome characteristics of the individual online content items describing aspects of consumer actions resulting from the individual online content items;

receiving user defined search queries specifying parameter values for one or more of the parameters of the individual online content items, wherein the specified parameter values are devoid of information that identifies producers of the individual online content items;

identifying individual online content items having parameter values that satisfy the user defined search queries without regard to the producers of the individual online content items, such that responsive to receipt of a first user defined search query specifying parameter values for a first set of one or more parameters, a first set of individual online content items having parameter values that satisfy the first user defined search query is identified;

receiving user specified tasks for identified individual online content items included in the first set of individual online content items, the user specified tasks being related to brand integration within the identified individual online content items included in the first set of individual online content items, the user specified tasks comprising a first user specified task for the identified individual online content items included in the first set of individual online content items;

effectuating presentation of the user specified tasks to the producers associated with the identified individual online content items, such that a first producer that generates a first identified individual online content item is presented with the first user specified task;

evaluating performance of the first user specified task by the first producer to determine an outcome corresponding to the first user specified task; and distributing compensation based on the outcome, the compensation including a stored value including a representation of payment earned by the first producer.

11. The method of claim 10, wherein:

an individual online content item includes an individual video, an individual photo, or an individual social media post.

12. The method of claim 10, wherein the user specified tasks include one or more of integrating an advertisement into a portion of online content, creating a portion of online content, endorsing a portion of online content, and/or promoting a portion of online content.

13. The method of claim 10, further comprising, responsive to presenting the user specified tasks to producers, facilitating acceptance of one or more of the user specified tasks by one or more producers.

14. The method of claim 10, further comprising facilitating approval of the user specified tasks, approval being confirmation that the user specified task performed by one or more producers represents the user specified task presented.

15. The method of claim 10, further comprising facilitating a display of the individual online content items resulting from the user specified task, the display being a publication of the individual online content items resulting from the user specified task.

16. The method of claim 15, further comprising facilitating display of the individual online content items resulting from the user specified task, via a social media platform.

17. The method of claim 10, wherein the outcome includes a content consumer action based on the individual online content items resulting from the user specified task.

18. The method of claim 10, wherein the outcome characteristics describing aspects of consumer actions resulting from the individual online content items include one or more of a promotion count of the individual online content items, an endorsement count of the individual online content items, or a sharing count of the individual online content items.

* * * * *